(12) United States Patent
Kit

(10) Patent No.: US 7,035,822 B1
(45) Date of Patent: Apr. 25, 2006

(54) SELF-SERVICE TERMINAL

(75) Inventor: Andrew Kit, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/573,097

(22) Filed: May 17, 2000

(30) Foreign Application Priority Data

May 20, 1999 (GB) .................................. 9911608.9

(51) Int. Cl.
*G06Q 40/00* (2006.01)

(52) U.S. Cl. ........................................ 705/39; 382/124

(58) Field of Classification Search ................ 186/35, 186/37; 353/79; 705/43; 382/121, 174, 382/181, 103
See application file for complete search history.

(56) References Cited

U.S. PATENT DOCUMENTS 5,217,088 A    6/1993 Dallman
5,644,119 A    7/1997 Padula et al.
6,373,402 B1 * 4/2002 Mee

FOREIGN PATENT DOCUMENTS

WO            8903467        4/1989

* cited by examiner

*Primary Examiner*—Richard Weisberger
(74) *Attorney, Agent, or Firm*—Gregory A. Welte

(57) ABSTRACT

A self-service terminal (SST) (10) for interaction with vehicle-based users includes a projection unit 36 which projects an image onto a vehicle windscreen. The image may include instructions or options for the user, or other information. In one embodiment, the SST also includes a sensor unit (38) which detects an action performed by the user on an area of the projected image. The actions are interpreted into instructions for a processor (34), which may then instruct the SST (10) to perform the appropriate action. The SST may also include a non-contact user identification means.

9 Claims, 2 Drawing Sheets

SELF-SERVICE TERMINAL

BACKGROUND OF THE INVENTION

The present invention relates to a self-service terminal (SST). In particular, the invention relates to an SST having a user interface for facilitating interaction with a user seated in a vehicle.

Self-service terminals (SSTs), such as automated teller machines (ATMs) are increasingly used for many transactions, particularly those involving valuable media, such as dispensing cash or banknotes. The majority of ATMs are intended for use by pedestrians. However many people will use a vehicle to travel to an ATM, and so have to park the vehicle, get out of the vehicle, carry out their transaction while standing at the ATM, and then return to the vehicle. Therefore, in many situations, it is desirable to provide ATMs which may be used while the user remains seated in the vehicle, such that the user may drive up to and stop adjacent the ATM, carry out their transaction, and then drive away, all without the need to dismount from the vehicle. Accordingly, there are a growing number of "drive-up" ATMs, that is ATMs for serving vehicle-based users. In addition to saving the user time, such ATMs may be more convenient and safer for the user particularly if, for example, there are children in the vehicle or the ATM is in an isolated location. Also, if drive-up ATMs are available, it is likely that fewer car parking spaces will be required in the vicinity of the ATM.

However, one difficulty associated with the provision of drive-up ATMs is the necessity for the user to interact with the ATM from within their vehicle. Conventional ATMs require the user to insert an identification means, such as a plastic card bearing a magnetic strip, enter a personal identification number (PIN) to confirm their identity, and then interact with the ATM by means of a display screen and a keypad. When a vehicle-based user is using a drive-up ATM, the user may have to twist around in their seat to view the display screen, and stretch out of the vehicle to insert their card. In inclement weather the user may also have to leave their vehicle window open for an extended period, while the vehicle interior becomes wet or cold. Of course this problem may be minimized to some extent by the provision of canopies and the like, however this adds to the ATM provider's costs. Furthermore, the wide range of vehicle shapes and sizes, as well as the different statures of vehicle drivers, may result in user-interfacing components of drive-up ATMs being difficult or awkward to access for many users.

SUMMARY OF THE INVENTION

It is among the objects of embodiments of the present invention to obviate or alleviate these and other difficulties of prior art ATMs.

According to one aspect of the present invention, there is provided a self-service terminal (SST) for interaction with a vehicle-based user, the SST comprising a projection unit for projecting an image onto a vehicle.

This SST facilitates user interaction with the terminal while the user remains seated in a vehicle. The projection unit enables information regarding transactions, services and the like to be displayed in a convenient location for the user, rather than on an external display screen to one side of the user, as with a conventional drive-up SST.

Preferably, the projection unit projects an image onto the windscreen of the vehicle: the image is therefore directly in front of the vehicle driver, and is in a convenient orientation for the vehicle driver to see. Alternatively, the image may be projected onto a side window of the vehicle, or an area of the vehicle dashboard.

An SST according to the present invention may also be provided with a data input means, for accepting instructions and information from the user. Conveniently, the data input means comprises a keypad mounted on the SST. As with conventional SSTs, this enables the user to enter details of the transaction to the SST. Alternatively, or in addition, the data input means may comprise a sensing means for detecting an action performed by the user on, or in proximity to, a region of the projected image and translating the detected action to a terminal instruction. This sensing means enables the user to enter data via the projected image while remaining wholly within the vehicle, rather than being required to reach out of the vehicle to operate an external keypad.

Preferably, the sensing means distinguishes between actions performed on a number of discrete regions of the image, each action corresponding to a particular terminal instruction.

Similarly, the sensing means allows the user to enter required instructions, information or commands: for example, an image of a keypad may be projected onto the vehicle, and a user may enter their PIN by touching the appropriate regions of the image.

Preferably, the sensing means is linked to a processor for processing instructions produced in response to user actions, thereby enabling the SST to perform selected actions on the basis of the region of the image selected by the user.

The sensing means may comprise a camera oriented to capture an image of the user in a vehicle; suitable processing means may then be used to "interpret" the captured image and identify which region of the projected image the user is touching and the instruction to the terminal this is intended to represent.

Alternatively, the sensing means may comprise a sonic or optical relay, whereby a signal of sound or electromagnetic radiation is projected onto the windscreen, and the reflection of the signal detected. If the user touches a point on the windscreen, this will cause the reflected signal to vary, which may then be detected and interpreted to identify the region of the projected image touched.

A further alternative sensing means comprises a radio or infra-red detector which functions in conjunction with a radio or infra-red emitter provided on a vehicle further provided with a touch-sensitive windscreen. Techniques for producing touch-sensitive screens are well known; such a system may be incorporated in the present invention whereby signals from the touch sensitive screen are transmitted from the vehicle to the detector of the SST. Advantageously, the transmitted signals are encoded to prevent unauthorized interception and determination of transaction information.

Preferably, the SST further comprises a means for identifying users. Conveniently, this may comprise a card reader slot, into which the user may insert their identification card, which, in conjunction with a PIN entered by the user confirms their identity. However, this requires the user to reach out of their vehicle, and so may detract from the comfort of using the SST. Accordingly, it is preferred that the identification means is a remote or non-contact identification means. This may comprise a remote card sensor, which may be able to read the information held in a "smart" card without being in physical contact with the card; or may comprise a biometric sensor, which may for example determine characteristics of the user's iris while seated in the vehicle, or may read the user's handprint when a hand is placed against the vehicle windscreen. Of course, other remote identification methods may be used.

Preferably, the SST further comprises a dispensing means for dispensing media, such as banknotes, a record of the transaction, or any other media.

Preferably, the components of the SST are so aligned such that the dispensing means is located adjacent the user when the vehicle is aligned optimally with respect to the projection unit. This minimizes the amount of movement required of the user.

Preferably, the SST comprises a further sensor means for detecting a vehicle approaching the SST. Preferably also, the projection means is activated to project instructions onto the vehicle when a vehicle approaches. These instructions conveniently take the form of instructions as to how to best locate the vehicle for optimal accessibility to the SST. In this way, the user can ensure they are in the ideal position before commencing their transaction.

The SST may further comprise a sensor to determine the size and shape of the vehicle, and thereby project the image at a suitable location: for example, it may be difficult to interpret an image projected onto a steeply raked windscreen, therefore in such cases the image may be projected onto the driver's side window or another area of the vehicle. Alternatively, the vehicles may be provided with identifying indicia, transponders or the like which enable the terminal to identify the vehicle make and model and thus select an appropriate format and location for the projected image.

According to a further aspect of the present invention there is provided a method of enabling a self-service terminal (SST) to interact with a vehicle-based user, the method comprising the step of:

projecting an image onto a vehicle, the image containing information or instructions for the user.

Preferably, the method further comprises the steps of:

detecting an action performed by the user on or in proximity to a region of the projected image; and translating the detected action to a terminal instruction.

BRIEF DESCRIPTION OF THE DRAWING

These and other aspects of the present invention will now be described by way of example only and with reference to the accompanying figures, in which.

DETAILED DESCRIPTION

Figure 1:
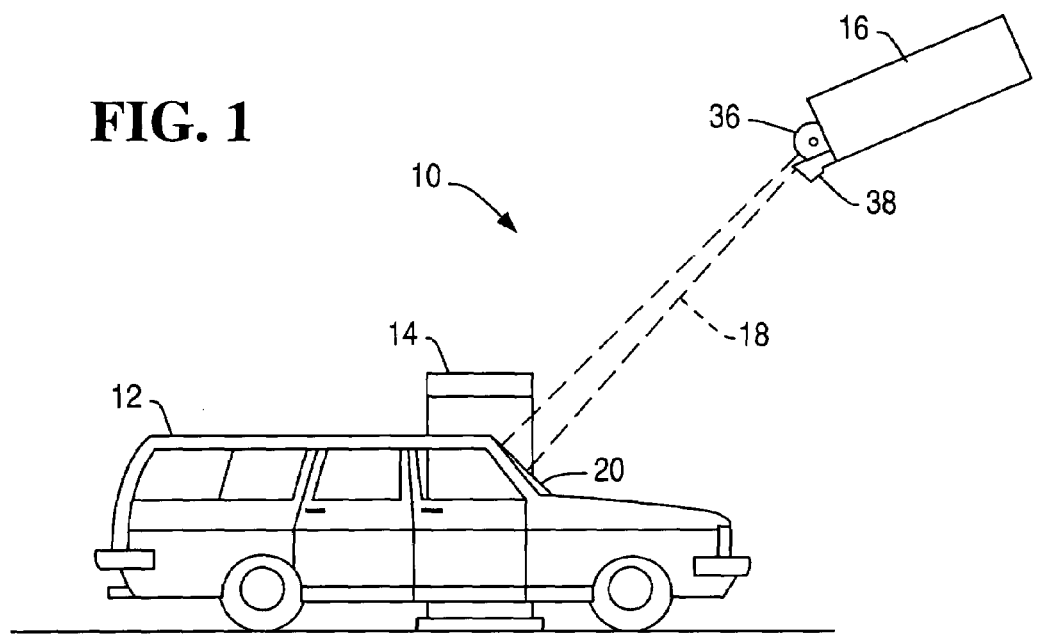
FIG. 1 shows a schematic view of a self-service terminal (SST) for use by a user in a vehicle according to an embodiment of the present invention.
Figure 2:
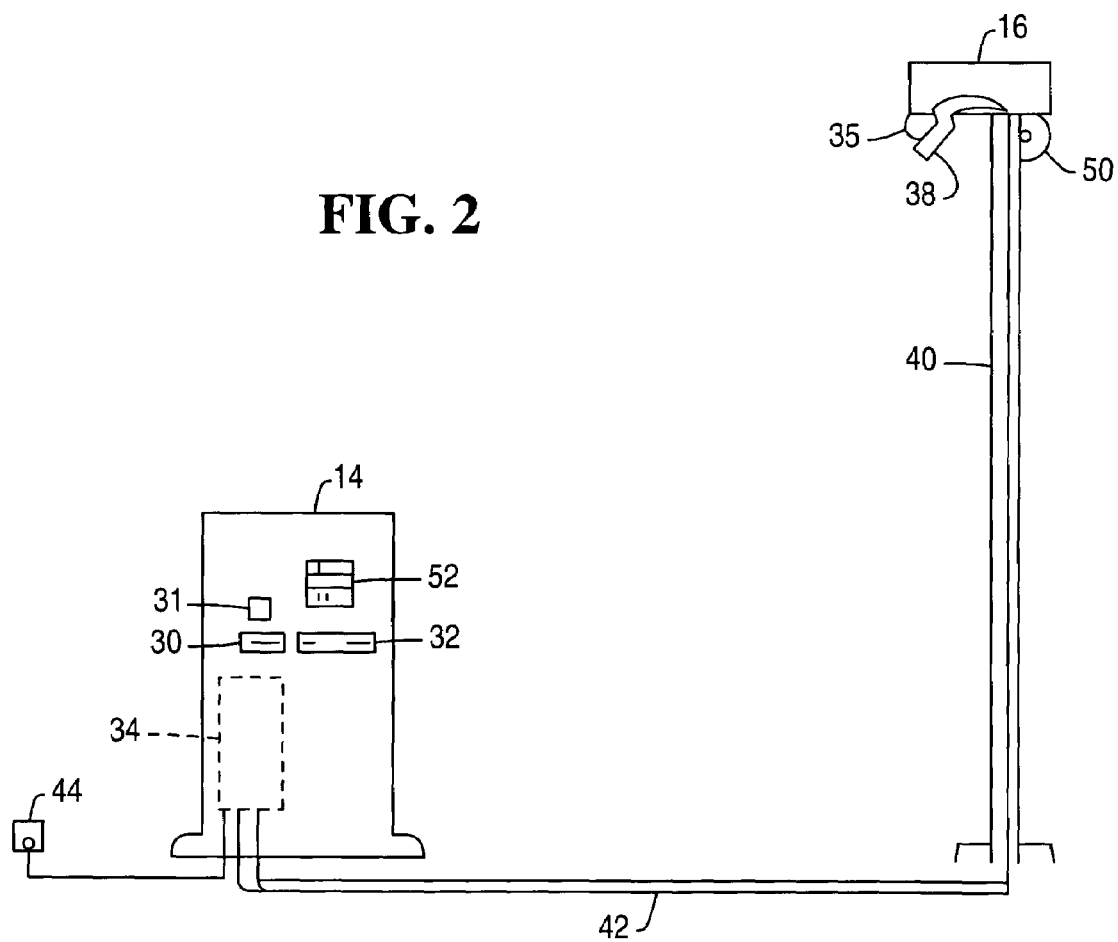
FIG. 2 shows a further schematic view of the SST of FIG. 1.

Referring first to FIGS. 1 and 2, these show schematic views of an ATM 10 for use by a user in a vehicle according to an embodiment of the present invention. The typical location of a user's vehicle 12 is also shown in FIG. 1. The ATM 10 comprises two primary units: the ATM body 14 and a projection/sensor unit 16. The body 14 is similar to a conventional ATM, and provides openings in which a user may insert their ATM card or deposit items; or from which the user may remove banknotes or receipts and the like. In the present embodiment, the ATM body further comprises a conventional keypad 52 enabling the ATM to be used by motorists who are unable or choose not to interact with the ATM as described below. An alternative embodiment may also comprise conventional display screen, enabling pedestrians to interact with the ATM.

The projection/sensor unit 16 is shown schematically, and includes a projector which projects an image 18 onto the windscreen 20 of the vehicle 12 when the vehicle 12 is in the appropriate position relative to the unit 16. The projection/sensor unit 16 also includes a camera 38 which monitors the actions of the user. When the user touches an area of the windscreen 20, the image thus detected by the camera is passed to the processor 34, which may then calculate, by means of appropriate algorithms, the region of the image which was touched, and hence the action desired by the user. Alternatively, the user may use the keypad 52 to interact with the ATM.

The projection/sensor unit 16 is connected to the ATM processor 34, which is contained within the ATM body 14. This controls all the functions of the ATM, including the projection of the image 18 and the operation of the camera 38 for determining which part of the projected image the user has chosen to activate.

FIG. 2 also shows the card reader slot 30 and the cash dispensing slot 32 on the ATM body 14, as well as the location of ATM processor 34 within the ATM body 14. The card reader slot 30 may be replaced or supplemented in other embodiments of the invention with a remote card reading unit 31, which may detect information stored on a smart card located remotely from the ATM body 14; for example, inside a user's wallet within the vehicle.

The projector/sensor unit 16 incorporates a projector 36 and a camera 38 and is mounted on a post 40 situated remotely from the ATM body 14. Suitable cables 42 connect the projector 36 and camera 38 to the controlling processor 34. The camera 38 may in alternative embodiments be replaced with other suitable sensor means.

The projector/sensor unit 16 may also be provided with a motor unit 50 which may adjust the direction of projection of the image to best align the image into the vehicle: for example, the camera 38 when activated may initially detect the direction the vehicle is facing and the height of the windscreen, and adjust the direction of the projection/sensor unit 16 accordingly.

The location of the projection/sensor unit 16 is such that the projected image will appear optimally when the driver of the vehicle is situated alongside the cash dispensing slot 32. This location of the vehicle may be ensured by projecting an image containing positional instructions onto a vehicle before a transaction is commenced. The positional instructions may indicate to a driver of the vehicle the distance and direction to be traveled to attain optimum alignment.

The ATM may further comprise an additional sensor 44, such as an infra-red emitter/receiver located on the ground alongside the ATM body 14. This can be used to detect the approach of a vehicle and so activate the ATM, preparing it to commence a transaction, and activating the projection/sensor unit 16. This will aid the conservation of energy when the system is not being used.

Figure 3:
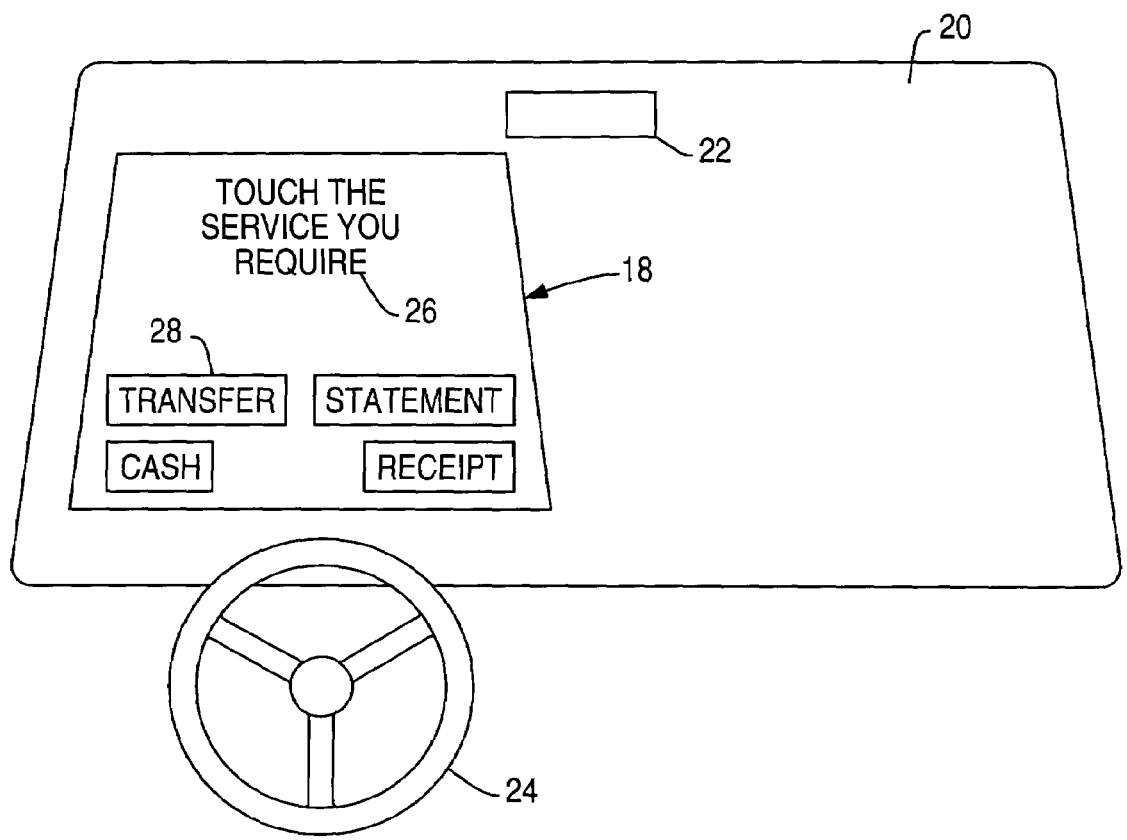
FIG. 3 shows an example of an image provided for a user of the SST of FIG. 1.

An example of a view from the perspective of a user is shown in FIG. 3. This shows the windscreen 20, rear view mirror 22 and steering wheel 24 of a left-hand drive vehicle. The invention described herein may of course be configured to serve both left-hand and right-hand drive vehicles, depending on in which country the ATM is to be situated.

The image 18 is projected onto the windscreen 20 in front of the driver of the vehicle. The image may include instructions 26 for the user and a selection of transaction types 28.

These choices 28 may also be marked out as being areas to the touch of which the ATM will respond. The projection may of course incorporate numerous alternative images, for example, pictures, advertisements, a keypad for entering data, and the like. As the image 18 is projected onto the windscreen 20 of the vehicle, the user may easily reach forward and touch the windscreen 20 to select one of the choices. The initial projection may also include an option to project the image onto the other side of the vehicle, for example, if the passenger rather than the driver wishes to carry out a transaction.

It will be clear from the foregoing that the present invention provides an SST with an interface for users in vehicles that is simple and convenient to use, and reduces the discomfort necessary to use an SST while seated in a vehicle. It will further be clear to the person of skill in the art that various modifications and improvements may be made to the SST described herein without departing from the scope of the invention.

What is claimed is:

1. An apparatus for enabling a user in a vehicle to carry out a self-service transaction from the vehicle, the apparatus comprising:
    means for projecting onto the vehicle an image of a user interface containing information or instructions for the user in the vehicle to carry out the transaction from the vehicle;
    means for detecting when the user in the vehicle touches one of a number of predefined areas of the image projected on the vehicle to select an action to be taken in carrying out the transaction from the vehicle; and
    processing means coupled to the detecting means and for determining which predefined area of the image on the vehicle has been touched by the user in the vehicle to determine what action has been selected by the user in carrying out the transaction from the vehicle.

2. An apparatus according to claim 1, further comprising means for dispensing valuable media to the user in the vehicle, and wherein the processing means includes means for controlling the dispensing means to dispense valuable media when a determination is made that the user in the vehicle has selected an action which requires dispensing of media.

3. An apparatus according to claim 1, further comprising means for sensing when the vehicle has approached to within at least a predetermined distance from the projecting means to allow the projecting means to be activated to project the image of the user interface on the vehicle.

4. An apparatus according to claim 1, wherein the detecting means comprises a camera.

5. An apparatus according to claim 1, further comprising means for adjusting direction of projection of the image of the user interface to align the image of the user interface on the vehicle.

6. An apparatus according to claim 5, wherein the adjusting means comprises a motor.

7. A method of processing a self-service transaction carried out by a user in a vehicle, the method comprising the steps of:
    projecting onto the vehicle an image of a user interface containing information or instructions for the user in the vehicle to carry out the transaction from the vehicle;
    detecting when the user in the vehicle touches one of a number of predefined areas of the image projected on the vehicle to select an action to be taken in carrying out the transaction from the vehicle; and
    determining which predefined area of the image on the vehicle has been touched by the user in the vehicle to determine what action has been selected by the user in carrying out the transaction from the vehicle.

8. A method according to claim 7, further comprising the step of:
    dispensing valuable media to the user in the vehicle when a determination is made that the user in the vehicle has selected an action which requires dispensing of media.

9. A method according to claim 7, further comprising the step of:
    adjusting direction of projection of the image of the user interface to align the image of the user interface on the vehicle.

* * * * *